United States Patent [19]
Littman et al.

[11] Patent Number: 5,254,168
[45] Date of Patent: Oct. 19, 1993

[54] COATING APPARATUS HAVING OPPOSED ATOMIZING NOZZLES IN A FLUID BED COLUMN

[76] Inventors: Howard Littman, 7 Tulip Tree La.; Morris H. Morgan, 1233 Viewmont Dr., both of Schenectady, N.Y. 12309; Stevan D. Jovanovic, C-22 Sunset Terr., Troy, N.Y. 12180

[21] Appl. No.: 893,827

[22] Filed: Jun. 4, 1992

[51] Int. Cl.$^5$ ............................................. B05B 7/00
[52] U.S. Cl. ..................... 118/666; 34/57 A; 118/20; 118/24; 118/62; 118/303; 118/316; 118/692; 118/697; 118/DIG. 5; 261/5; 261/78.2
[58] Field of Search .............. 118/666, 667, 683, 684, 118/697, 707, 712, 16, 20, 24, 62, 303, 316, DIG. 5; 427/3, 213, 422; 34/10, 57 A; 261/5, 131, 136, 78.2

[56] References Cited

U.S. PATENT DOCUMENTS

| | | | |
|---|---|---|---|
| 2,648,609 | 8/1953 | Wurster | 99/166 |
| 2,799,241 | 7/1957 | Wurster | 118/24 |
| 2,986,475 | 5/1961 | Mesnard et al. | 118/303 |
| 3,089,824 | 5/1963 | Wurster | 167/82 |
| 3,112,220 | 11/1963 | Heiser et al. | 118/24 |
| 3,196,827 | 7/1965 | Wurster et al. | 118/24 |
| 3,207,824 | 9/1965 | Wurster et al. | 264/117 |
| 3,241,520 | 3/1966 | Wurster et al. | 118/62 |
| 3,411,480 | 11/1968 | Grass et al. | 118/24 |
| 4,895,733 | 1/1990 | Imaniois et al. | 118/303 |
| 4,960,244 | 10/1990 | Maag et al. | 118/303 |

*Primary Examiner*—Joseph W. Drodge
*Attorney, Agent, or Firm*—Richard C. Litman

[57] ABSTRACT

A fluid-bed particle coater having a dual-jet and spray arrangement and including an upstanding column which has an upper cylindrical section, a tapered intermediate section and lower cylindrical section. Depending from the lower cylindrical section is a cylindrical chamber which is inner-connected to tubular sections adapted for introducing multiple air streams via separately controlled inlet openings. The dual-jet and spray construction includes an upwardly-facing spray nozzle positioned in coaxial relationship to the tubular sections and a draft tube, and a downwardly-facing spray nozzle contained with a fountain tube which is disposed above the draft tube. The fountain and draft tubes concentrically intersect about the intermediate section of the column in an opened telescopic arrangement. The dual-jet and spray particle coater provides multiple coating and drying zones and is conveniently adapted with a completely integrated computer control system that provides for automatic and continuous monitoring and control of all fluid flowrates, temperatures and critical pressure measurements throughout the fluidized coating system.

17 Claims, 2 Drawing Sheets

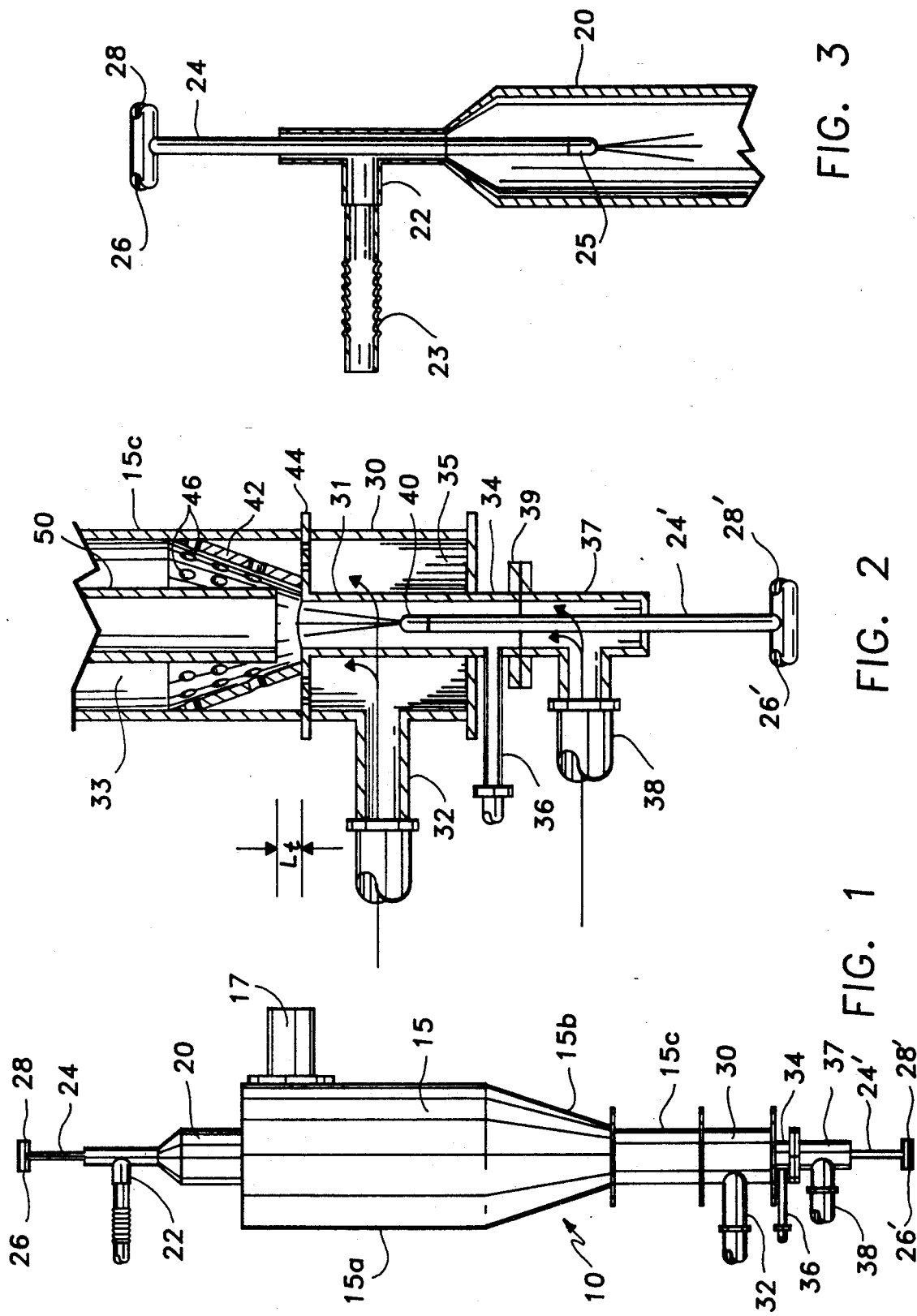

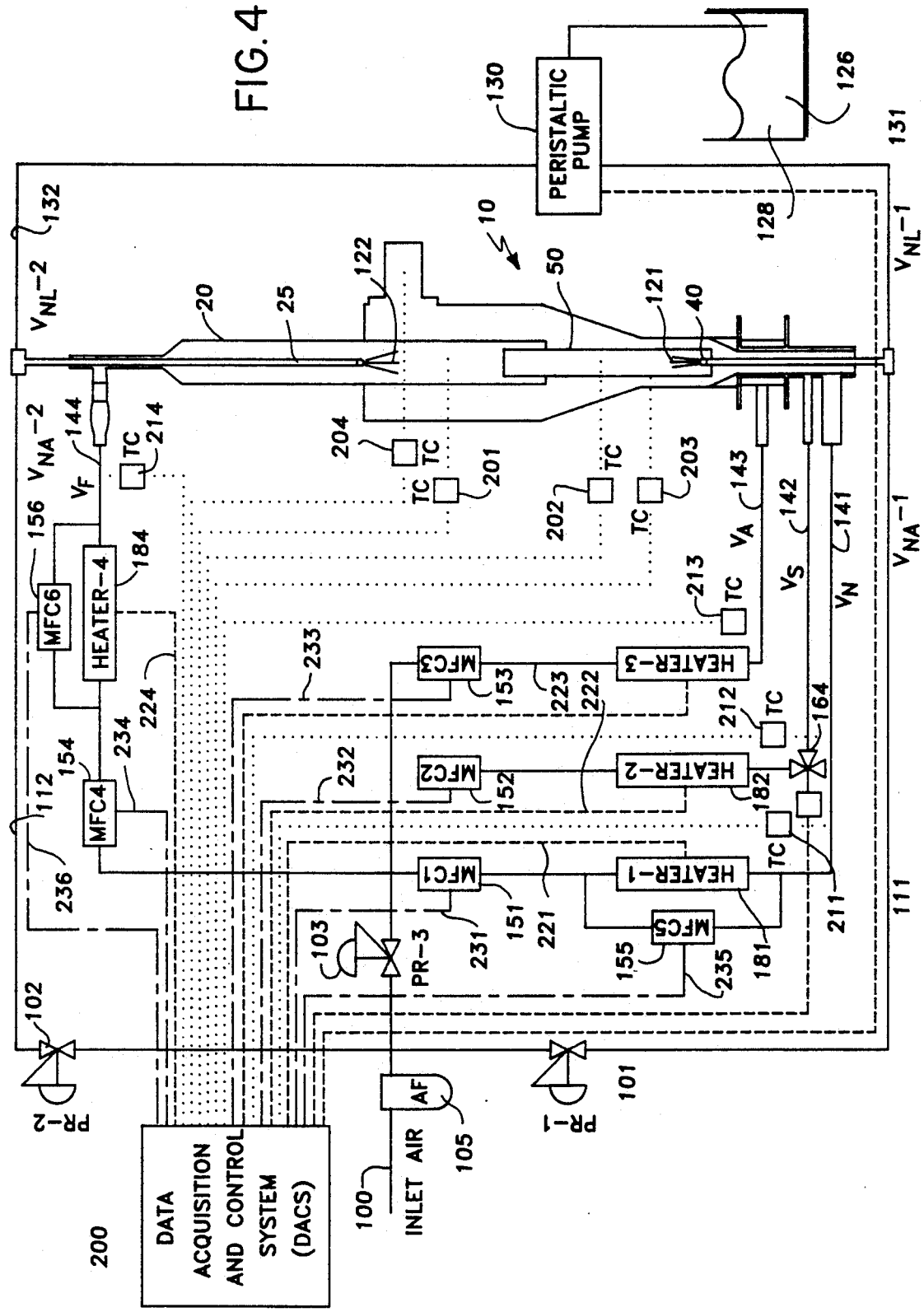

COATING APPARATUS HAVING OPPOSED ATOMIZING NOZZLES IN A FLUID BED COLUMN

BACKGROUND OF THE INVENTION

1. Field of the Invention

This invention relates generally to an apparatus for spray coating discrete particles while such particles are suspended in a fluidized bed. More particularly, the present invention relates to a fluid-bed particle coater having a dual-jet and spray arrangement which is adapted to automatically monitor and control all essential processing parameters of the fluidized-bed coating operation.

2. Description of the Prior Art

The application of fluid-bed technology for coating tablets, granules, pellets and other discrete particles is well known in the prior art, having been described in considerable detail in such patent literature as U.S. Pat. Nos. 2,648,609, 2,799,241, 3,089,824, 3,196,827 and 3,207,824 to Wurster and Wurster et al. Such fluidized-bed coating processes find particular application in the pharmaceutical field and generally involve supporting uncoated particles in a vertical column by injecting a continuous stream of air from the bottom of a column. A coating solution is atomized and sprayed onto the air-suspended particles, and the particles are then dried while supported by the air. The drying time of the applied coating should be regulated by controlling the atomization rate and/or the temperature of the supporting air stream. Also, the velocity of the air stream should be adjustable so that the air-suspended particles are maintained in a relatively confined region of the column. Moreover, the air stream is usually directed into one portion of the suspended bed of particles at a higher velocity than in the remaining portion of the fluidized bed. This causes the particles to flow upwardly in the portion of the bed subjected to the higher velocity air and induces a downward flow in the remaining portion of the bed to create a cyclical vertical movement of the particles within a generally central region of the column. Since the particles are repeatedly recirculated within the column, successive layers of coating solution are applied to the particles until a coating of the desired thickness is formed.

The apparatus that has been commercially utilized for conducting a fluidized-bed coating procedure typically comprises a cylindrical column having a tapered lower section terminating in an air inlet opening. A screen or other porous member usually extends across the air inlet to retain particles in the column when the flow pressurized air is discontinued. At or above the center of the screen is an upwardly-directed nozzle for spraying liquid coating materials upwardly into the central zone of the column. As the air-suspended particles commence their upward travel within the central zone of the column, they are coated with the liquid coating discharged from the nozzle. The liquid deposited on the particles dries as these coated particles migrate upwardly within the central zone and as they travel downwardly through an annular outer zone of the column. The dried coated particles subsequently reenter the central region of the column where the coating is successively applied until a satisfactory film coat is obtained.

A variety of modifications to the general apparatus and procedure described hereinabove has been proposed in an attempt to improve the overall efficiency of the fluidized-bed coating operation. For instance, U.S. Pat. No. 3,241,520 to Wurster et al. discloses an apparatus wherein the central region of the column is provided with a partition for separating the upwardly and downwardly moving particle streams in order to establish a greater upward velocity of air in the coating zone. However, this as well as other prior art structural modifications fail to overcome the reported disadvantages of fluidized-bed coating systems. Such acknowledged disadvantages include surface imperfections resulting from vigorous agitation of the coated granules and loss of coating material to the air exhaust, which present certain fundamental problems to the pharmaceutical industry. Also, undesirable particle elutriation from the fluidized bed presents both a health and safety hazard, resulting in both the loss of scarce product materials and the need for expensive pollution control equipment. It was further found that these prior art coating procedures were imprecisely controlled by conventional equipment. Adjustments to these fluidized systems to account for variations in the processing conditions during operation were difficult to accomplish, causing variations in the finished products.

SUMMARY OF THE INVENTION

Accordingly, it is a primary object of the present invention to provide an apparatus which is readily adaptable for efficiently controlling all essential processing parameters of a fluid-bed coating operation.

It is a further object of the invention to provide an apparatus which is capable of automating the coating of discrete particles, whereby a precisely controlled fluidized system can be obtained and adjusted during operation.

It is among the further objects of the present invention to provide a fluid-bed particle coater having multiple high-velocity coating zones, and multiple heating and drying zones which can be independently monitored to control the flow distribution, flow rate and temperatures of all processing streams within the apparatus. The ability to control particle elutriation from the fluidized bed and substantially eliminate the need for such equipment as cyclones and bag filters is an additional object of this invention.

These and other objects are accomplished in accordance with one aspect of the present invention which provides a fluid-bed particle coater having a dual-jet and spray arrangement and including an upstanding column which has an upper cylindrical section provided with a vent, an intermediate tapered section which communicates at its upper end with the upper cylindrical section and which progressively reduces in diameter towards its lower end for communication with a lower cylindrical section. Depending from the lower cylindrical section is a cylindrical chamber provided with a lateral air entry port, which chamber is innerconnected to tubular sections adapted for introducing multiple air streams via separately controlled inlet openings. The lateral entry port of the chamber is provided for introducing air to the annular region of the column. Auxiliary means for heating the air streams are also provided.

The dual-jet and spray design includes an upwardly-facing spray nozzle inserted at a lower inlet opening which can be positioned below or inside the inlet to a draft tube, and a downwardly-facing spray nozzle disposed above the draft tube and encompassed within a fountain tube. The fountain and draft tubes have different inner diameters and intersect within the upper cylindrical section in an opened telescopic arrangement. An inlet port is provided for introducing air into the fountain tube and air inlet openings at the tubular sections provide air to the draft tube. Air and coating liquid from a suitable source are separately introduced into both nozzles to produce an aerosol spray. Air entering the tubular sections from separate inlets passes through a jet inlet tube and can be made to co-flow or swirl before entering the lower cylindrical section of the apparatus. This serves to control flow distribution between entering air streams and also to confine the coating spray to the inlet of the draft tube.

The dual-jet and spray particle coater of the invention provides two spray coating zones; there is the usual one located below the inlet to the draft tube and a second one located above the outlet of the draft tube. The fountain tube serves as an additional spray coating zone, a zone to introduce heat for drying and a means for controlling the height of the particle fountain issuing from the draft tube. Unlike conventional apparatus designs, where particles are retained by filters above the fluid bed, the fountain flow of the present invention redirects particles back to the annular zone of the column where additional diffusional drying occurs. In this way, a highly efficient no impact, gas-particle separation is provided.

In accordance with another aspect of the present invention the fluid-bed particle coater is conveniently adapted with a completely integrated computer control system that provides for automatic and continuous monitoring of all fluid flowrates, temperatures and critical pressure measurements throughout the system. These outputs are electronically monitored and the resulting data are used to control the coating process by making real-time adjustments to critical input parameters.

The foregoing and other features, advantages and objects of the invention may be more fully appreciated by reference to the following detailed description and accompanying drawings.

BRIEF DESCRIPTION OF THE DRAWINGS

FIG. 1 is a side elevational view of the fluid-bed particle coater of the present invention.

FIG. 2 is a cross-sectional view of the lower portion of the fluid-bed particle coater of the invention showing details of the draft tube and annulus inlet sections.

FIG. 3 is a cross-sectional view of the upper portion of the fluid-bed particle coater of the invention showing details of the fountain tube inlet section.

FIG. 4 is a schematic representation of the automated fluid-bed particle coating system of the present invention.

DETAILED DESCRIPTION OF THE PREFERRED EMBODIMENTS

Referring particularly to FIG. 1, there is generally shown a fluid-bed coater 10 preferred for use in the practice of the present invention which includes an upstanding outer column 15 having an upper cylindrical body section 15*a* provided with a horizontally disposed vent 17, a downwardly tapered intermediate section 15*b* and a lower cylindrical section 15*c*. Extending axially above cylindrical body section 15*a* is a vertically positioned fountain tube 20 which is adapted with an air inlet port 22 and a T-shaped spray extension 24 terminating in opposing inlets 26 and 28. Depending from lower cylindrical section 15*c* is cylindrical inlet chamber 30 which is provided with a horizontally disposed air entry port 32. Tubular channel 34 with an associated swirl inlet line 36 depends from inlet chamber 30 and communicates with air inlet tubular chamber 37 adapted with jet air inlet opening 38. Centrally protruding from the bottom of tubular chamber 37 is T-shaped spray extension 24' provided with terminally opposing inlets 26' and 28'.

The column 15, as well as other elements of the present apparatus, may be constructed of a rigid non-pervious material such as stainless steel. Sight windows can be conveniently placed at various locations throughout the apparatus to permit easy viewing of the coating procedure.

FIG. 2 depicts the lower portion of the fluid-bed particle coater 10 showing details of the entry area to draft tube 50 and air inlet sections 30, 34 and 37. As illustrated, an upwardly-facing atomizing spray nozzle 40 is positioned in coaxial relationship to a jet inlet tube 31 and draft tube 50 (partially shown). Spray nozzle 40 extends centrally through tubular channel 34 and tubular chamber 37, then terminates in T-shaped spray extension 24' provided with opposing inlets 26' and 28'. The jet inlet tube 31 is arranged annularly around spray nozzle 40 and physically separates the annulus 35 of cylindrical chamber 30 from the nozzle.

Chamber 30 serves as a plenum for annulus air in lower cylindrical section 15*c*. Aeration flow to the annular zone 33 surrounding the draft tube 50 is provided through a perforated cylindrical insert 42 via air entry port 32. Insert 42 has a downwardly tapered upper surface terminating in a central opening and is supported at its base by the interior edge of flange 44. The central opening of insert 42 communicates with the top opening of jet inlet tube 31. A plurality of vertically spaced-apart openings 46, each preferably about ⅛" in diameter, permeates insert 42 to provide an air stream to annular zone 33 of a lower velocity than that feeding the draft tube. Particle circulation rate may be controlled by altering the flowrate to annular zone 33 and varying the distance between the inlet to draft tube 50 and outlet of jet inlet tube 31, designated as $L_t$. A screen of uniform mesh size (not shown) may be fabricated to cover the tapered surface of insert 42 to further prevent the particles from falling into the annulus region 35 of chamber 30 before and after the coating operation.

The spray nozzle 40 may be adjustably mounted to move up and down in the jet inlet tube 31 and can be vertically extended through the opening of tube 31 into the lower portion of draft tube 50 to optimize the location of the nozzle. Screen 39 extends across the bottom of tubular channel 34 to prevent particles from falling into tubular chamber 37 when nozzle 40 is positioned within jet inlet tube 31, as illustrated in FIG. 2. Under conditions in which it is necessary to extend the nozzle beyond the outlet of jet tube 31, a screen having a central opening (not shown) may be placed across the jet tube outlet to prevent particles from falling into the jet tube during periods when the coating operation is not in progress. The draft tube 50 may be adjustably mounted within column 15 by any convenient means such as one or more support brackets (not shown) to vary the $L_t$ distance.

Depending from cylindrical inlet chamber 30 is tubular channel 34 which communicates with jet inlet tube 31. Channel 34 is provided with a swirl flow inlet line 36 which controls the width of the spray from nozzle 40. Communicating with channel 34 is tubular chamber 37 and associated inlet opening 38. Hot air introduced via inlet lines 36 and 38 heats the coating material exiting spray nozzle 40. Coating material flows through spray extension 24' from coating inlet 28'.

FIG. 3 depicts the upper portion of the fluid-bed particle coater of the present invention showing a vertically positioned fountain tube 20 adapted with a horizontally disposed air inlet port 22 and terminating in a T-shaped spray extension 24 provided with opposing air inlet 26 and liquid coating inlet 28. Fountain tube 20 houses a downwardly-facing atomizing spray nozzle 25. The spray nozzle 25 may be adjustably mounted to independently slide up and down in the fountain tube 20 to optimize the location of the nozzle.

Heated air through air inlet 22 via flexible tubing 23 provides additional drying capacity during the coating procedure and controls the height of the particle fountain issuing from the draft tube. The fountain flow provides for a highly efficient, no-impact separation of the air and particles exiting the draft tube by redirecting and accelerating the particles downward towards the annular region of lower cylindrical section 15c while the upwardly flowing air stream passes through upper cylindrical section 15a and exists through vent 17. The diameter of the upper cylindrical section should be sufficiently large to reduce the air velocity below the terminal velocity of the particles.

Referring now to FIG. 4, a schematic representation of an automated fluid-bed particle coating system utilizing the coater 10 of the present invention is shown. As illustrated, fountain tube 20 has a greater diameter than draft tube 50 and both tubes concentrically intersect within the upper section of the column 15 in an opened telescopic arrangement.

In a schematic coating operation according to this particular embodiment of the invention, the inlet air supplied from a suitable source through line 100 is filtered in air filter (AF) 105 to remove solid particulates and liquid droplets. The inlet air is then split into three air streams containing pressure regulators PR-1, PR-2 and PR-3, designated numerically as 101, 102 and 103, respectively. Typically, all the air required for these air streams may be supplied by a suitable blower. The inner diameter of the lines feeding these streams is set to keep the pressure drop in the lines to less than 5 psig at the desired flowrate.

Air streams 111 and 112 are controlled by pressure regulators 101 and 102 which feed ambient air at volumetric flowrates $V_{NA}-1$ and $V_{NA}-2$ into spray nozzles 40 and 25, respectively, where the liquid coating is sheared to create aerosol sprays 121 and 122. The flowrates $V_{NL}-1$ and $V_{NL}-2$ of liquid streams 131 and 132 to the spray nozzles are controlled between 1 and 160 ml/min by a peristaltic pump 130. Reservoir 126 contains coating solution 128.

Air leaving the stream containing pressure regulator 103 is ultimately split into four hot air streams 141, 142, 143 and 144 having volumetric flowrates of $V_N$, $V_S$, $V_A$ and $V_F$, respectively. Mass flow controllers MFC-1, MFC-2, MFC-3 and MFC-4 designated as 151, 152, 153 and 154 provide the desired $V_N$, $V_A$, $V_S$ and $V_F$ flows in air streams 141, 142, 143 and 144, respectively. The volumetric flowrate $V_A$ provides aeration flow in the annulus surrounding the draft tube and facilitates the control of the particle circulation rate. The $V_F$ fountain flow is controlled by mass flow controller MFC-4. Mass flow controllers MFC-5 and MFC-6, designated 155 and 156, more efficiently control the temperatures of air streams 141 and 144 by providing a better dynamic response of respective heaters 1 and 4. The mass flow controller circuits designated by dot-dashed lines 231, 232, 233, 234, 235 and 236 have input and output capabilities which provide means for both monitoring and controlling all air flowrates. It should be noted that $V_N$ and $V_S$ flows ultimately confine the aerosol spray and control its spread by focusing the spray on the particles entering the draft tube. Alternatively, the $V_N$ and $V_S$ flows may be combined before entering the present apparatus through either air stream 141 or 142 by means of 3-way valve 164.

Heaters 181, 182, 183 and 184 via air streams 141, 142, 143 and 144, respectively, supply all the heat necessary for conducting the coating process and are controlled by output signals designated by dashed lines 221, 222, 223 and 224 from the data acquisition and control system (DACS) 200. The power fed to each heater is separately controlled to maintain the desired temperatures of the air inlet streams 141, 142, 143 and 144, as well as to maintain the temperatures in the draft and fountain tubes, and annular region of the column.

Thermocouple probes (TC) 211, 212, 213 and 214 are in electronic communication with the DACS 200 via circuits indicated by dotted lines to permit the temperatures of air streams 141, 142, 143 and 144 to be monitored and controlled. Thermocouple probes (TC) 201, 202, 203 and 204 are also electronically connected to DACS 200 via circuits indicated by dotted lines to allow temperatures in the draft tube, vent, annulus and fountain tube regions to be monitored and controlled. TC 204 also facilitates in controlling the energy balance of the coater. In the draft tube and fountain regions of the coater, fluid and particles are in intimate contact. The air is hot and the residence time for contacting is short. In the annulus of the coater, on the other hand, the contacting time is relatively long and the air comparatively cool.

Pressure probes (not shown) may be conveniently placed adjacent to thermocouple probes 201, 202, 203 and 204 and can be connected to a multi-channel pressure transmitter (also not shown). All electronic instruments and probes are in communication with the data acquisition and control system 200 which comprises a completely integrated computer control system provided with output means. The computer control system utilizes specially designed software to automatically control all inlet flowrates and temperatures, based on material and energy balances for the coater. Utilizing the present system, the particles will not be overheated and real time adjustments to critical input parameters can be accurately made. Also, interphase heat and mass transfer rates can be optimized during the coating operation.

The following example is given to further illustrate the invention, where flowrates, velocities and temperatures and power ranges for the illustrated coating experiment are specifically set forth therein.

EXAMPLE

A coating apparatus in electronic communication with an integrated computer control system according to the present invention is charged with 2.5 kg of a raw crystalline aspirin powder having an average particle diameter of about 200 $\mu$m. For purposes of this experimental run, an aqueous coating solution containing 25% by weight solids including a methacrylic acid copolymer is employed.

The coating apparatus having the design characteristics essentially the same as that illustrated hereinabove is used in this experiment. The column of the coater was made sufficiently large to prevent elutriation of the fine particles and cause them to fall back into the annulus. The diameter of the fountain tube is 150 mm and the diameter of the jet inlet tube is 63.5 mm. The diameter of the draft tube is 76.2 mm and the column diameter is 152.4 mm.

The volumetric flowrates and temperature ranges for streams $V_N$, $V_S$, $V_A$ and $V_F$ are given in Table 1. Heaters 181, 182, 183 and 184 have a capacity of 1.6, 0.6, 0.2 and 2.2 KW, respectively. Table 1 further gives the heater power associated with each stream. The flowrate for streams $V_{NA}-1$ and $V_{NA}-2$ was about 22 slpm and the run time for this experiment was approximately 150 minutes.

TABLE 1

| STREAM | FLOWRATE (slpm) | TEMP. (°C.) | POWER (KW) |
|---|---|---|---|
| $V_N$ | 1500–3000 | 50–55 | 1–1.5 |
| $V_S$ | 0 | — | 0 |
| $V_A$ | 100–150 | 30 | 0 |
| $V_F$ | 1000–1500 | 77–83 | 1.2–1.5 |

The entering $V_A$ stream has a relatively small flowrate, which is 3 to 5 times greater than the minimum fluidizing velocity of about 0.03 m/s. This prevents the agglomeration of particles falling in the annulus. By contrast, a relatively high velocity in the jet tube (7.9 to 15.8 m/s) is needed to entrain particles from the annulus. The jet flow, $V_N$, was adjusted during coating to obtain velocities of the order of 5 to 10 m/s which is 5 to 10 times the terminal velocity of the particles estimated to be about 1 m/s. At these velocities, pressure and voidage fluctuations disappear in the draft tube and the particles transport up the tube in a dilute phase flow at high voidages which was demonstrated to be the best regime for coating.

The initial coating did not dry completely in the draft tube before entering the fountain. However, the hot fountain air stream quickly vaporized the remaining volatile liquid so that the particles were relatively dry before being deposited at the top of the annulus. They were completely dry by the time they reentered the draft tube.

The high interphase heat and mass transfer coefficients during the coating process make it possible to evaporate all the water despite the short residence times of transit through the draft and fountain tubes. As long as fluid is evaporating, the particles cannot heat above their maximum allowable temperature of about 40° C. The lower temperature air fed to the annulus was always kept below this maximum temperature. A liquid flowrate of about 8–12 ml/min was found suitable for purposes of this experimental run.

While the above experiment demonstrates the feasibility of uniformly coating relatively fine particles in the range of 150 to 250 μm, coarser particles of the order of 1 mm including tablets may also be successfully coated without agglomeration using the system of the present invention. Also, while the coating operation of this invention finds particular application in the pharmaceutical field, it can be used in the field of agriculture or engineering, and the food processing industry for coating or encapsulating any type of particulate material, including both metallic and non-metallic powders.

It should be understood that there may be various changes and modifications of the representative embodiments herein chosen for purposes of illustration without departing from the spirit and scope of the invention. For example, multiple jet and spray arrangements are contemplated by the present invention wherein plural layers of the same or different coatings can be applied to particulate materials by series flow through a plurality of coating and subsidence zones. Also, while the use of air as the suspending medium has been shown to be satisfactory, any gas other than air such as nitrogen or an inert gas, for example, can be employed in the present invention. Accordingly, the foregoing illustrations are not to be interpreted as restrictive of the invention beyond that necessitated by the following claims.

We claim:

1. An apparatus for spray coating discrete particles while such particles are suspended in a apparatus, said apparatus comprising, in combination:
   an upstanding column including an upper cylindrical body section provided with a vent, a downwardly tapered intermediate section and a lower cylindrical section, said tapered intermediate section and said lower cylindrical section housing a vertically extending draft tube;
   a vertically positioned fountain tube adapted with an air inlet port and a spray extension terminating in opposing air and liquid inlets and extending axially above said upper cylindrical body section, said fountain tube housing a downwardly-facing atomizing spray nozzle and having a greater diameter than said draft tube, wherein both tubes concentrically intersect within the column in an opened telescopic dual-jet and spray arrangement;
   a cylindrical inlet chamber depending from and communicating with said lower cylindrical section, said cylindrical inlet chamber being provided with an air entry port and containing a jet inlet tube and an upwardly-facing atomizing spray nozzle positioned in coaxial relationship to said jet inlet tube and said draft tube;
   a tubular channel which depends from said cylindrical inlet chamber and communicates with said jet inlet tube, said tubular channel being provided with a swirl flow inlet line;
   an air inlet tubular chamber which depends from and communicates with said tubular channel, said tubular chamber being adapted with an air inlet opening and having a centrally protruding spray extension provided with terminally opposing air and liquid inlets; and
   regulating means for controlling flow distribution and flow rates within the apparatus and for controlling temperatures of all inlet streams to the apparatus.

2. The apparatus according to claim 1, wherein said jet inlet tube is arranged annularly around said upwardly-facing atomizing spray nozzle.

3. The apparatus according to claim 2, wherein said upwardly-facing atomizing spray nozzle is adjustably mounted to move up and down in said jet inlet tube and vertically extend into the lower portion of draft tube to optimize its location.

4. The apparatus according to claim 3, including a screen with an opening which extends across a jet tube outlet to prevent particles from falling into the jet tube when the upwardly-facing spray nozzle extends beyond said jet tube outlet.

5. The apparatus according to claim 1, wherein said air entry port of the cylindrical inlet chamber is arranged to provide aeration flow to an annular zone surrounding said draft tube.

6. The apparatus according to claim 1, wherein said lower cylindrical section contains a perforated cylindrical insert covered by a screen to prevent the particles from falling into the cylindrical inlet chamber before and after the coating operation, said insert and said screen having central openings which communicate with the top of said jet inlet tube.

7. The apparatus according to claim 6, wherein the distance between said top of the jet inlet tube and a bottom inlet to said draft tube is adjustable.

8. The apparatus according to claim 7, wherein said draft tube is adjustably mounted within said column to vary said distance between said top of the jet inlet tube and the inlet to said draft tube.

9. The apparatus according to claim 1, wherein said downwardly-facing atomizing spray nozzle is adjustably mounted to slide up and down within the fountain tube to optimize its location.

10. The apparatus according to claim 1, including a screen which extends across the bottom of said tubular channel to prevent particles from falling into the tubular chamber when the upwardly-facing spray nozzle is positioned within said jet inlet tube.

11. The apparatus according to claim 1, further comprising pressure regulator means, whereby air streams to both said spray extensions are separately controlled by said pressure regulator means which feed ambient air at volumetric flowrates into said downwardly-facing and upwardly-facing spray nozzles.

12. The apparatus according to claim 1, further comprising a peristaltic pump, whereby liquid streams to both said spray extensions are by controlled said peristaltic pump.

13. The apparatus according to claim 1, further comprising individual heaters to control the temperatures of the inlet air streams.

14. The apparatus according to claim 13, wherein each of said heaters are connected in series to mass flow controllers.

15. The apparatus according to claim 1, further comprising thermocouple probe and pressure probe means for monitoring temperatures and pressures within said column.

16. The apparatus according to claim 1, wherein said regulating means are in electronic communication with the a computerized data acquisition and control system.

17. The apparatus of claim 16, wherein said data acquisition and control system comprises a completely integrated computer control system provided with output means.

* * * * *